US007303707B2

(12) United States Patent
Rafferty

(10) Patent No.: US 7,303,707 B2
(45) Date of Patent: Dec. 4, 2007

(54) PROCESSING OF LIGNO-CELLULOSE MATERIALS

(75) Inventor: Andrew James Rafferty, deceased, late of Christchurch (NZ); by Karen Millicent Rafferty, legal representative, Christchurch (NZ)

(73) Assignee: Lignotech Developments Limited, Christchurch (NZ)

( * ) Notice: Subject to any disclaimer, the term of this patent is extended or adjusted under 35 U.S.C. 154(b) by 133 days.

(21) Appl. No.: 10/494,646

(22) PCT Filed: Oct. 16, 2002

(86) PCT No.: PCT/NZ02/00215

§ 371 (c)(1),
(2), (4) Date: May 5, 2004

(87) PCT Pub. No.: WO03/039825

PCT Pub. Date: May 15, 2003

(65) Prior Publication Data

US 2005/0173824 A1 Aug. 11, 2005

(30) Foreign Application Priority Data

Nov. 6, 2001 (NZ) ..................................... 515288

(51) Int. Cl.
*B27N 1/00* (2006.01)
*B27N 3/02* (2006.01)
*B27N 3/18* (2006.01)
*B29C 43/04* (2006.01)

(52) U.S. Cl. ........................ 264/115; 264/83; 264/109; 264/149; 162/23; 162/68; 34/362

(58) Field of Classification Search .................. 168/68; 264/149, 109, 232, 340, 347, 83, 115; 34/362, 34/395, 413, 552, 568; 162/68, 116, 23, 162/21
See application file for complete search history.

(56) References Cited

U.S. PATENT DOCUMENTS 2,008,892 A * 7/1935 Asplund ...................... 162/18

(Continued)

FOREIGN PATENT DOCUMENTS

CA 1 211 913 9/1986

(Continued)

OTHER PUBLICATIONS

Smook, G.A., Handbook for Pulp & Paper Technologists, TAPPI, 1982.*

(Continued)

*Primary Examiner*—José A. Fortuna
(74) *Attorney, Agent, or Firm*—McCormick, Paulding & Huber LLP

(57) ABSTRACT

A method of processing lignocellulosic material includes the steps of comminuting the material to a size that it can be processed in a hydrothermal pressure vessel, drying the material in moving air to obtain a specific moisture content, packing the material into the vessel and subjecting the material within the vessel to steam under pressure, decompressing the vessel to return the temperature and pressure to ambient and drying the product to specific moisture content; the product so formed can be used for injection moulding or to form panel boards and the like.

18 Claims, 1 Drawing Sheet

U.S. PATENT DOCUMENTS

Figure 1:
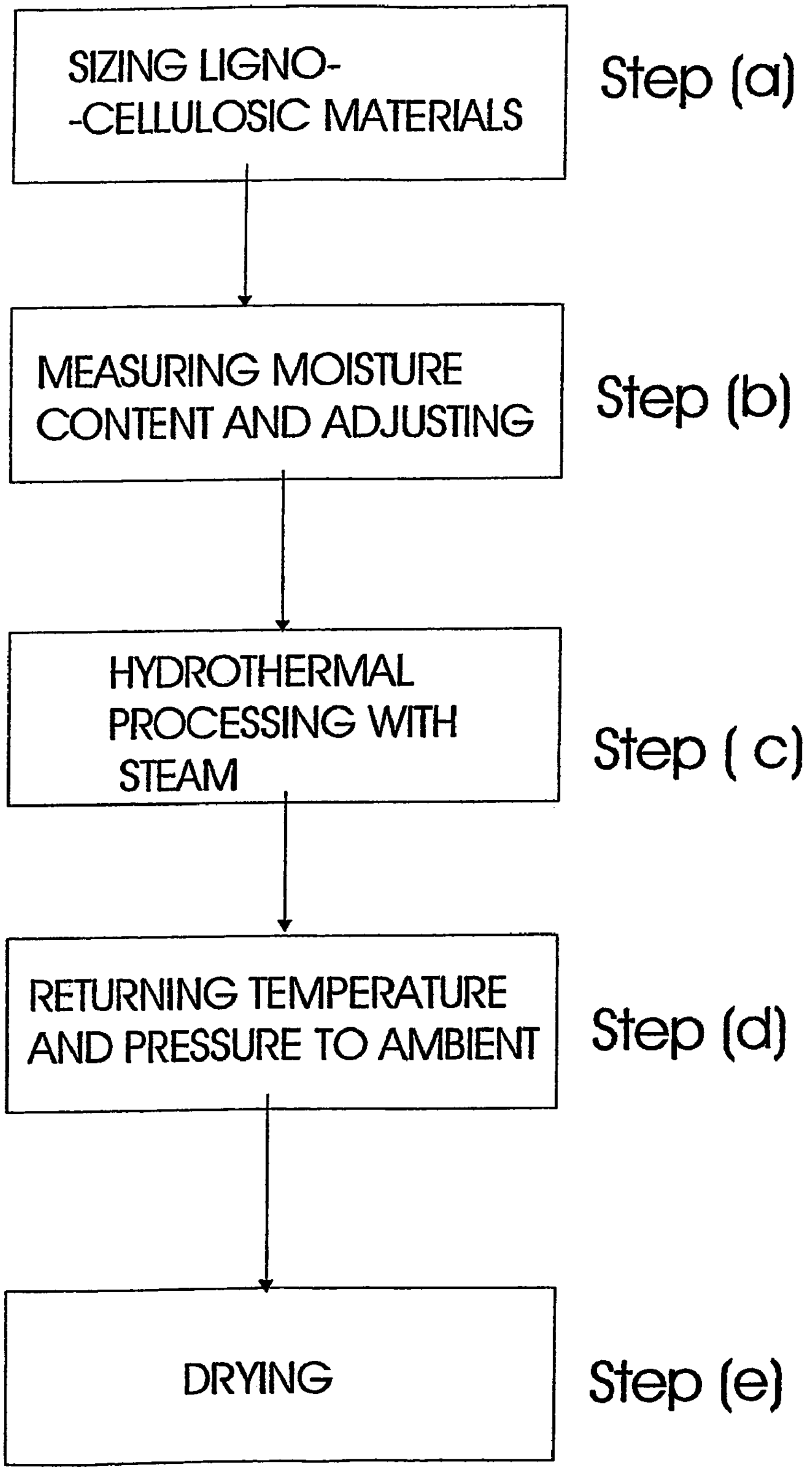

| | | | | |
|---|---|---|---|---|
| 2,303,345 | A | 12/1942 | Mason | |
| 2,800,945 | A * | 7/1957 | Schilling | 162/116 |
| 2,964,416 | A * | 12/1960 | Glab | 106/165.01 |
| 3,199,213 | A * | 8/1965 | Milligan et al. | 34/396 |
| 4,152,197 | A * | 5/1979 | Lindahl et al. | 162/19 |
| 4,431,479 | A * | 2/1984 | Barbe et al. | 162/9 |
| 4,599,138 | A * | 7/1986 | Lindahl | 162/19 |
| 4,751,034 | A | 6/1988 | DeLong | |
| 5,017,319 | A * | 5/1991 | Shen | 264/124 |
| 5,023,097 | A * | 6/1991 | Tyson | 426/271 |
| 5,328,562 | A | 7/1994 | Rafferty | |
| 5,705,216 | A * | 1/1998 | Tyson | 426/478 |
| 6,306,248 | B1 * | 10/2001 | Eley | 162/4 |
| 6,409,841 | B1 * | 6/2002 | Lombard | 127/37 |
| 2001/0052657 | A1 * | 12/2001 | Jacobsen | 264/211 |
| 2005/0173824 | A1 * | 8/2005 | Rafferty et al. | 264/109 |

FOREIGN PATENT DOCUMENTS

| | | |
|---|---|---|
| DE | 40 33 849 | 4/1991 |
| EP | 0 492 016 | 7/1992 |
| EP | 346559 B1 * | 11/1993 |
| EP | 0 642 898 | 3/1995 |
| EP | 0 373 726 | 6/1995 |
| EP | 1 033 212 | 9/1999 |
| WO | WO 03039825 A1 * | 5/2003 |

OTHER PUBLICATIONS

Derwent Abstract Accession No. 2001-173267/18. JP 2001001318 A (Takahashi Kikan KK) Jan. 9, 2001 Abstract.

* cited by examiner

PROCESSING OF LIGNO-CELLULOSE MATERIALS

FIELD OF THE INVENTION

This invention relates to a method of processing ligno-cellulosic materials to produce a range of useful end products including composite products such as panel boards.

BACKGROUND TO THE INVENTION

It is known to produce composite products from waste products containing cellulosic materials by chemically transforming the natural sugars into a bonding and bulking agent by the application of heat and pressure. Such methods have been used for many years and one well-known method is generally called 'explosion hydrolysis'. That method consists in placing the material to be processed in a strong closed vessel, passing high-pressure steam into the vessel for a specific period and then opening the vessel in such a manner that the material explodes out of the vessel. In particular the explosion process affects hemicellulose, which is a non-structural component of woody material. During the explosion process hemicellulose is broken down initially into simple sugars, which are further transformed with other products during the explosion process to form the resinous material that bonds the product

PRIOR ART

U.S. Pat. No. 1,578,609 granted in 1926 to William H Mason of USA described a process and apparatus for the disintegration of lignocellulosic material. The method consisted in the chipping of small pieces of timber, placing them in a closed high pressure chamber, commonly known as a 'gun' and subjecting the material to pressure by steam, compressed air or the like. After sufficient time to allow the gases to penetrate the wood and to establish a balance of pressure and temperature in the wood, an outlet valve of comparatively small dimension is opened to cause the material to be forcibly driven out of the chamber through the valve opening. As the pieces of wood emerge, they are progressively disintegrated.

This method, described in U.S. Pat. No. 1,578,609, has subsequently become known as 'explosion hydrolysis' and further discussion on this method can be found in the specification of U.S. Pat. No. 2,303,345 (Mason and Boehm), which describes a process for making products from lignocellulosic material by using high pressure steam in a gun to separate the lignin from ligno-cellulose and to hydrolyse the hemicellulose into water-soluble material.

The disadvantage with the process disclosed in the U.S. Pat. No. 2,303,345, known as the 'Masonite' process, is that it produces a water-soluble adhesive so that the adhesive bond formed by the Masonite process tends to liquefy with a consequent deterioration of the quality of the product.

U.S. Pat. No. 5,017,319 (Shen), discloses a process for converting hemi-cellulosic materials into a thermoset waterproof adhesive. The process consists in bringing lignocellulosic material which contains at least 10% hemicellulose into contact with high pressure steam to decompose and hydrolyse the hemicellulose into a resin material without significant carbonisation of the hemicellulose. The material is then heated and pressed against a surface to thermoset and adhere the material to the surface.

U.S. Pat. No. 5,328,562 Rafferty and Scott, describes a process and an apparatus for producing a lignocellulosic product whereby the lignocellulosic material is hydrolysed in a primary zone and the product is moved from the primary zone to a secondary zone into which superheated steam bled from the primary zone is introduced under sufficient pressure to dry the hydrolysis products. This specification is concerned with a continuous energy re-circulation system so there will be a minimum of waste energy in the process.

It is also well known that the quality of a product formed by the explosion process depends largely on how well the adhesive polymer produced during the explosion process is spread throughout the material and how well the material is compacted. The temperature during the process is very important because if the temperature is too high, degradation of the natural sugars would occur and this would produce water and reduce the efficiency of the surface coating and of the adhesive resulting in a weaker and less water-repellent product. If the temperature is too low, a less efficient dispersal of the adhesive polymer occurs and that would result in a product that might not have the desired qualities. Therefore the water content management of the process is vital for good process performance.

In addition, it is known that both furan and hydroxymethylfuran, which are sugars from which water has been removed, are often present in the processed product. This can occur at high temperatures where there is little free water and where reactions occur which demand water, such as when lignin is being broken down. Furans are reactive and will readily take part in the lignin repolymerisation process and even small amounts will assist to link together large molecules in the processed product. Consequently it is necessary to control the amount of moisture very closely to produce a satisfactory product.

OBJECT OF THE INVENTION

It is an object of this invention to provide an improved process whereby ligno-cellulosic material can be transformed into a material which can be formed into a product which will exhibit superior qualities when compared to similar products produced by previously known explosion processes.

It is also an object of this invention to provide a process whereby a large variety of lignocellulosic material such as agricultural wastes including but not limited to cereal straw, sawdust, woodchips, waste wood in the form of small particles, bark, newsprint and other paper and cardboard can be processed into a satisfactory material from which composite products, such as boards and panels can be manufactured.

As used herein, the term "free flowed material" means loose (i.e., as poured, not packed) lignocellulosic material and the term is readily understood by one skilled in the art.

DISCLOSURE OF THE INVENTION

Accordingly the present invention provides a method of processing lignocellulosic materials including the steps of:

(a) providing at least one lignocellulosic material each having a particle size capable of being processed in a hydrothermal pressure vessel;

(b) drying the material in moving air until the moisture content is between 11% to 25% of the gross mass of the lignocellulosic material, the moisture content of the dried material being calculated by further drying the resultant material to a constant mass in still air at 86.5° C.±1° C. and relating this to the initial mass of the lignocellulosic material;

(c) packing the material in a hydrothermal pressure vessel in a manner that no more than 2 times the free flowed material is treated;
(d) subjecting the packed material with steam in the pressure vessel at a pressure below 65 bar for up to 10 minutes;
(e) returning the temperature and pressure to ambient;
(f) drying the product until the product has a moisture content of up to 10% by weight, seconds.

Preferably the temperature and pressure is returned to ambient in about 2 seconds.

Preferably the processed material is then dried in moving air below 90° to have a moisture content of 3%, the moisture content of the dried material being calculated by further drying the resultant material to a constant mass in still air at 86.5° C.±1° C. and relating this to the initial mass of the lignocellulosic material;

Preferably the temperature of the moving air is above 55° C. and below 75° C.

Preferably, the product produced by the process is pressed and cured at a temperature and pressure and for a length of time necessary to produce a product having the desired properties.

Preferably the temperature during the pressing and curing stage is in the range of between 60° C. to 200° C.

DESCRIPTION OF PREFERRED FORMS OF THE INVENTION

The range of lignocellulosic material which may be processed is broad. Amongst the materials that may be processed are *Pinus radiata* sawdust and mixed sawdust from the species *Cupressus macrocarpa, Pinus radiata, Eucalyptus* sp and *Acacia* sp. Other material can be for instance Rimu (*Dacrydium cupressum*) and Red Beech (*Nothofagus* sp) shavings and sawdust, wheat straw, and oat straw chaff. These examples of suitable materials are not intended to be limiting and are provided solely as an indication of some of the materials that can be processed. For instance other materials such as bark and recycled paper can be utilised.

The material to be processed is comminuted to a size that will enable the material to be gunned in known hydrothermal pressure vessels. In a highly preferred form, the material is comminuted to a size that will fall within the range of length up to 40 mm, width up to 6 mm and a height of up to 6 mm. In a yet more highly preferred form, the thickness of the material to be processed will be no greater that 5 mm. It is however to be understood that under certain circumstances, it is possible to process material of a greater the moisture content of the dried material being calculated by further drying the resultant material to a constant mass in still air at 86.5° C.±1° C. and relating this to the initial mass of the lignocellulosic material.

Preferably the material to be processed is reduced in size to be within a range of a length up to 40 mm, a width not exceeding 6 mm, and a thickness not exceeding 6 mm prior to being packed into the hydrothermal pressure vessel.

Preferably the thickness of the particle size of the untreated lignocellulosic material is no greater than 5 mm.

Preferably the temperature of the moving air is below 90° C.

Preferably the temperature of the moving air is above 55° C. and below 90° C.

Preferably the temperature of the moving air is in the range of 55° C. to 75° C.

Preferably the moisture content of the dried material is calculated by further drying the resultant material to a constant mass in still air at 86.5° C.±1° C. and relating this to the initial mass of the lignocellulosic material Preferably the materials are dried to a moisture content of not less than 11% by weight.

Preferably, a rapid, low temperature drier is used.

Preferably after the materials are dried they are packed into the pressure vessel in a manner that no more than 1.5 times the free flowed material is treated.

Preferably the packed material is subjected in the pressure vessel to dry steam or steam which is up to 5° C. superheated Preferably the packed material is subjected to steam in the pressure vessel at a pressure between 32 to 45 bar for a period of up to ten minutes.

Preferably the period the packed material is subjected to steam is between 30 to 100 size than set out above and this disclosure is not to be restricted to the preferred ranges.

The comminuted material is dried in moving air preferably in a cyclonic drier at an appropriate temperature. The temperature selected will depend upon the characteristics of the material to be processed so the material will not be damaged during the drying process. In certain conditions, it may be preferable to dry the material in air at, for instance, 70° C. but generally it has been found that a drying temperature of up to 90° C. is satisfactory while in certain circumstances it is possible for even higher temperatures to be used. The air velocity is regulated in combination with the temperature of the moving air to ensure adequate control of the drying is obtained to produce a dried material which will have a moisture content of between 11% and 25%. It has been found that in many instances, the optimum moisture content should be approximately 16%.

One preferred method of calculating the moisture content is to dry the material until it has a constant mass in still air at 86.5° C.±1° C. and relating this to the initial mass of the material processed. This moisture content may in addition, capture the mass loss associated with the loss of other volatile components. Other methods of calculating and determining the moisture content as are known in the art can also be utilised.

The material is then packed into a hydrothermal reactor in a manner that preferably up to 2 times but highly preferably no more than 1.5 times the free-flowed material is packed into the reactor. The reactor is then injected with dry or up to 5° C. superheated steam at a pressure preferably below 65 bar and preferably between 32 to 45 bar for the required period to enable satisfactory processing of the material to be obtained. The pressure and temperature are selected to ensure the material is not burnt and there is no undue deterioration of its physical characteristics such as smell. The time of processing can be up to ten minutes although the usual time will normally be between 30 to 100 seconds. It is possible to utilise greater pressures in some circumstances.

After processing is complete, the pressure vessel is decompressed at a rate that will maintain the production of superheat. This time may vary but the decompression is preferably carried out in less than about 2 seconds.

The steam for the hydrolysation must be 100% dry for optimal conditions but in certain circumstances the steam can be slightly superheated up to approximately 5° C. which will assist to accelerate the initial chemical reaction and reduce the condensation in the reactor vessel while pressure is being built up to the required amount.

The consumption of steam will depend on a. The chemical reaction required;

b. The projected end use of the processed material;

c. The time and pressure for a specific reaction;

d. The time the material is in the hydrothermal reactor before the required pressure is built up;

e. The type of lignocellulosic material being processed;

f. The temperature and the amount of moisture of the material packed into the reactor.

Preferably immediately the material is discharged from the reactor, it is cooled to prevent further chemical reaction and the product is then dried in moving air, preferably in a second cyclone, at a temperature below 90° C. and preferably above 55° C. and more preferably below 75° C. The dried material will preferably have a moisture content of between 1% and 10% and more preferably 3%, the moisture content being calculated by drying to a constant mass in still air at 86.5° C.±1° C. as previously described. The hydrolysed lignocellulosic materials may be dried in a number of ways; for example, one suitable drying technique is disclosed in U.S. Pat. No. 5,236,132.

The dried material can then be stored for later processing, such as injection molding. If the material is to be utilized to form panel board and the like it will be pressed and cured for a time and at a temperature which will provide the desired characteristics and properties of the resultant product. In a highly preferred form the temperature can be within the range of between 40° C. to 200° C. but more preferably it will be between 60° C. and 200° C. with the pressure and the time profile determining the properties of the resultant product. These properties can vary from water resistant and dense through to very high density and strength or to relatively porous with low water resistance.

Thus it has been found possible to produce a panel board having the following features:

A density between 400 $kg/m^3$ and 1800 $kg/m^3$.

A thickness between 3 mm and up to 50 mm and possibly up to 400 mm or more.

Materials having moisture resistance from low to complete.

Mechanical properties similar to the Australian HMR standard.

FIG. 1 shows the process steps as a flow diagram.

For step (a), a wide range of particle shapes may be used (e.g. flakes, chips, bars, pellets) but the overall size must fall within the stated range. If the material to be processed has a larger particle size, the steam might not have adequate access to the particle.

In step (b), the moisture content is adjusted by drying,

Step (c) may be carried out as a batch or as a continuous process. In this step, the lignocellulosic materials are hydrolysed by the action of the steam, and when the temperature and pressure are lowered back to ambient, the lignocellulosic material is in the form of a broken, shredded mass.

The dried hydrolysed lignocellulosic material has been processed successfully in the following products:

1. Pressing and moulding to form compressed waterproof board having a density in the range of 400-1800 $kg/m^3$. Preferably the platen temperature is kept within the range of 120° C. to 210° C. while the press time will be determined by the density required in the finished product. As an example, the press time for a density of 1600 $kg/m^3$ will be approximately 240 seconds, while for a density of 600 $kg/m^3$, the press time is 15 minutes.
2. Injection moulding to form solid shapes.
3. Pelletizing to form pelletized fuel. In this example, the initial materials can include straw, sawdust, bark or municipal lignocellulosic waste, and/or combinations of these. The calorific value of the resultant fuel is similar to that of medium-grade domestic coal.

Having described preferred methods of putting the invention into effect, it will be apparent to those skilled in the art to which this invention relates, that modifications and amendments to various features and items can be effected and yet still come within the general concept of the invention. It is to be understood that all such modifications and amendments are intended to be included within the scope of the present invention.

The invention claimed is:

1. A method of processing lignocellulosic materials including the steps of:

(a) providing at least one lignocellulosic material each having a particle size capable of being processed in a hydrothermal pressure vessel;

(b) drying the material in moving air until the moisture content is between 11% to 25% of the gross mass of the lignocellulosic material;

(c) packing the dried material from step (b) into a hydrothermal pressure vessel; said dried material being packed into said hydrothermal pressure vessel in such a mariner that the mass of the packed material in said hydrothermal pressure vessel is not more than two times the mass of the material which would fill said hydrothermal pressure vessel if said material were free flowed into said hydrothermal pressure vessel;

(d) subjecting the packed material with steam in the pressure vessel at a pressure below 65 bar for up to 10 minutes to effect chemical changes in the lignocellulosic material;

(e) returning the temperature and pressure to ambient; and (f) drying the material from step (e) until said material has a moisture content up to 10% by weight.

2. The method of processing lignocellulosic materials as claimed in claim 1, wherein the material to be processed is reduced in size to be within a range of a length up to 40 mm, a width not exceeding 6 mm, and a thickness not exceeding 6 mm prior to being packed into the hydrothermal pressure vessel.

3. The method of processing lignocellulosic materials as claimed in claim 2, wherein the thickness of the particle size of the untreated lignocellulosic material is no greater than 5 mm.

4. The method of processing lignocellulosic materials as claimed in claim 1, wherein the temperature of the moving air is below 90° C.

5. The method of processing lignocellulosic materials as claimed in claim 4, wherein the temperature of the moving air is above 55° C. and below 90° C.

6. The method of processing lignocellulosic materials as claimed in claim 4, wherein the temperature of the moving air is in the range of 55° C. to 75° C.

7. The method of processing lignocellulosic materials as claimed in claim 1, wherein in the moisture content of the dried material at either or both of steps (b) or (f) is calculated by further drying the resultant material to a constant mass in still air at 86.5° C.±1° C. and relating this to the initial mass of the lignocellulosic material.

8. The method of processing lignocellulosic materials as claimed in claim 1, wherein the materials are dried to a moisture content of not less than 11% by weight.

9. The method of processing lignocellulosic materials as claimed in claim 1, wherein a drier operating at a temperature not exceeding 90° C. is used.

10. The method of processing lignocellulosic materials as claimed in claim 1, wherein after the materials are dried they are packed into the pressure vessel in a manner that no more than 1.5 times the free-flowed material is treated.

11. The method of processing lignocellulosic materials as claimed in claim 10, wherein the packed material is subjected in the pressure vessel to dry steam or steam which is up to 50° C. superheated.

12. The method of processing lignocellulosic materials as claimed in claim 10, wherein the packed material is subjected to steam in the pressure vessel at a pressure between 32 to 45 bar for a period of up to ten minutes.

13. The method of processing lignocellulosic materials as claimed in claim 10, wherein the period the packed material is subjected to steam is between 30 to 100 seconds.

14. The method of processing lignocellulosic materials as claimed in claim 1, wherein the pressure is returned to ambient in less than about 2 seconds.

15. The method of processing lignocellulosic materials as claimed in claim 1, wherein the processed material is then dried in moving air below 90° C. to have a moisture content of 3%, the moisture content of the dried material being calculated by further drying the resultant material to a constant mass in still air at 86.5 C.±1° C. and relating this to the initial mass of the lignocellulosic material.

16. The method of processing lignocellulosic materials as claimed in claim 15, wherein the temperature of the moving air is above 55° C. and below 75° C.

17. The method of processing lignocellulosic materials as claimed in claim 1, wherein the product produced by the process of claim 1 is pressed and cured at a temperature and pressure for a length of time to produce a product having predetermined properties.

18. The method of processing lignocellulosic materials as claimed in claim 17, wherein the temperature during the pressing and curing stage is in the range of between 60° C. and 200° C.

* * * * *

UNITED STATES PATENT AND TRADEMARK OFFICE

CERTIFICATE OF CORRECTION

PATENT NO. : 7,303,707 B2 Page 1 of 1
APPLICATION NO. : 10/494646
DATED : December 4, 2007
INVENTOR(S) : Andrew James Rafferty It is certified that error appears in the above-identified patent and that said Letters Patent is hereby corrected as shown below:

Column 6, line 21, after “a”, please delete “mariner” insert -- manner --.

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,303,707 B2
APPLICATION NO. : 10/494646
DATED : December 4, 2007
INVENTOR(S) : Andrew James Rafferty It is certified that error appears in the above-identified patent and that said Letters Patent is hereby corrected as shown below:

Claim 11:

Column 7, line 4 after “to”, please delete “50º C.” insert -- 5º C. --.

Signed and Sealed this

Twentieth Day of January, 2009

JON W. DUDAS
*Director of the United States Patent and Trademark Office*